United States Patent [19]

Muller

[11] 4,407,985

[45] Oct. 4, 1983

[54] METHOD OF MAKING AND IMPROVED COMPOSITIONS FOR AN INITIALLY ERASABLE INK FOR A BALL POINT WRITING INSTRUMENT

[75] Inventor: Frank A. Muller, Los Angeles, Calif.

[73] Assignee: Scripto, Inc., Doraville, Ga.

[21] Appl. No.: 374,938

[22] Filed: May 5, 1982

[51] Int. Cl.$^3$ .................. C09D 11/18; B41K 7/00; B43K 7/10; C08K 5/01

[52] U.S. Cl. .................. 523/161; 401/190; 401/209; 524/563; 524/565

[58] Field of Search ............... 523/161; 260/DIG. 38; 401/190, 209

[56] References Cited

U.S. PATENT DOCUMENTS

| | | | |
|---|---|---|---|
| 4,297,260 | 10/1981 | Feree et al. | 523/161 |
| 4,329,262 | 5/1982 | Muller | 523/161 |
| 4,329,264 | 5/1982 | Muller | 523/161 |

OTHER PUBLICATIONS

Derwent Abst. 27627 E/14, Feb. 1982 J5703173 Mitsubishi Pencil.
Derwent Abst. 06981 D/05 Nov. 1981 J55152769 Pilot Pen.
Derwent Abst. 27104 E/14, Feb. 1982 J57034170 Mitsubishi Pencil.
Derwent Abst. 55103 D/30, Jul. 1981 JJP8101858 Pentel KK.
Derwent Abst. 42733 D/24 Apr. 1981, J56043374 Pilot Ink KK.
Derwent Abst. 58013 D/32 Jun. 1981, J56076477 Pentel KK.
Derwent Abst. 74849 D/41 Aug. 1981, J56109265 Pentel KK.

*Primary Examiner*—Melvyn I. Marquis
*Assistant Examiner*—Herbert J. Lilling
*Attorney, Agent, or Firm*—Newton, Hopkins & Ormsby

[57] ABSTRACT

An initially erasable ink composition for a ball point writing instrument which ink is characterized by its initial erasability by ordinary pencil erasers when applied by a ball point writing instrument to an absorbent paper-like writing surface and which thereafter develops permanence. The ink composition comprises polar elastomers, such as butadiene/acrylonitrile copolymer rubbers and vinyl acetate/ethylene copolymer rubbers, and mixtures thereof, either alone or in admixture with cis-1, 4-polyisoprene (natural rubber or synthetic nature rubber), pigment, and a solvent system. The polar elastomer is present in the range of about 14–25% by weight of the ink and the pigment is present in amount sufficient to impart color and intensity to a trace of the ink when applied to a substrate such as paper. The solvent system essentially comprises a volatile component having a boiling point less than about 180° C. and an essentially non-volatile component which includes pigment vehicle having a boiling point greater than about 300° C. and low viscosity plasticizer having a boiling point greater than 180° C. but less than 300° C., the solvent system being present in amount sufficient to impart a final ink viscosity in the range of about 1.5 million cps.

13 Claims, No Drawings

METHOD OF MAKING AND IMPROVED COMPOSITIONS FOR AN INITIALLY ERASABLE INK FOR A BALL POINT WRITING INSTRUMENT

CROSS REFERENCE TO RELATED APPLICATIONS

This application is related to my following co-pending applications:
1. Ser. No. 136,787, filed Apr. 3, 1980—will issue on May 11, 1982 as U.S. Pat. No. 4,329,264.
2. Ser. No. 247,363, filed Mar. 25, 1981—will issue on May 11, 1982 as U.S. Pat. No. 4,329,262.
3. Ser. No. 247,982, filed Mar. 26, 1982 which issued on Sept. 14, 1982 as U.S. Pat. No. 4,349,639.

1. Field of the Invention

The present invention pertains to the composition for an initially erasable ink for a ball point writing instrument which ink is characterized by its initial erasability by ordinary pencil erasers when applied by a ball point writing instrument to an absorbent paper-like writing surface and which thereafter develops permanence.

2. Description of the Prior Art

Many frequently interrelated factors must be taken into account in the formulation of a writing medium. These factors fall into two categories, namely, those which stem from the type writing instruments to be used in dispensing the writing medium onto the writing surface, and those which are concerned with the desired characteristics that the writing medium possesses after being dispensed.

The principal type of writing instrument that is to be used with the ink composition of the present invention is a ball point writing instrument.

Insofar as the characteristics of the writing medium in the "after dispensed" state are concerned, appearance and relative indelibility are the most important. In most cases, the appearance of the writing medium means little more than the color of the written line. Indelibility is related to the ease of removal of the written line. Thus, an indelible writing medium is one which is resistant to removal from the writing surface. Obtainment of a high degree of indelibility is not always necessarily desirable. In some instances one may want a writing medium which immediately is not easily removable by mechanical means from the writing surface, while in other instances one may want a writing medium which at least initially is easily removable but which may attain permanence of indelibility over an extended period of time, as for example, over a period of hours. If such a medium is to be considered as being truly erasable, it must be readily removable at least during an initial period of time from the substratum to which it has been applied without any damage of any significant degree to the area of the substratum involved.

In order to understand the nature of this invention, consideration must first be given to the conditions which the formulator of an erasable writing medium must avoid. This in turn requires at least an elementary knowledge of the structure of paper, since paper is the substratum most commonly employed as a writing surface.

Paper is essentially a mat of randomly oriented cellulose fibers. Thus, paper consists of solid structural members, namely the cellulose fibers, having numerous minute voids therebetween. From the description, it may readily be seen that the formulator or designer of an erasable writing medium must prevent the colorant portion of the medium from penetrating to any substantial degree into the voids in the surface being written upon because if there is substantial penetration into the voids the subsequent removal of the colorant by mechanical means cannot be accomplished without damage to the writing surface. Likewise, it may readily be seen that for a writing medium to be erasable, the colorant particles must be prevented from affixing themselves with any substantial degree of permanence, either by chemical reaction or as a result of mere physical attraction, to the solid members of the paper substratum.

In the past, attempts to achieve an erasable writing medium for a ball point pen usually have been unsuccessful. Of course, one may use a superabrasive eraser to remove ordinary ball pen inks from the paper substratum normally used for writing purposes. As discussed above, such substratum is porous to some degree and the ball pen inks in ordinary usage tend to penetrate those pores. In addition, the colorants in such inks tend to affix themselves to the fibers which constitute the solid portion of the substratum. Therefore, the only way to erase markings made with ordinary ball pen inks is to physically remove a substantial number of the fibers in the vicinity of the markings. As a result, the paper substratum is generally so damaged during the erasure process that it is rendered unsuitable for any further use as a writing surface.

Attempts have been made to modify ordinary ball pen ink so as to prevent the colorant portion thereof from penetrating the pores of the paper substratum. These attempts consisted of substituting pigment-type colorants for the dye-type colorants normally used in ball pen inks. The reasoning behind this approach was that since pigment-type colorants normally have a greater particle size than dye-type colorants, the pigment-type colorants would become substantially immobile on deposition upon the surface of the paper substratum and, therefore, would not tend to penetrate into the pores of the paper. However, this line of reasoning overlooked the fact that in a ball point writing instrument, the ink is dispersed through a very minute clearance between the ball and socket and that any pigment-type particle which is small enough to be so dispensed will tend to behave as if it were a dye-type particle. Therefore, the colorant portion of such inks was not immobilized to any significant degree and as a consequence, no substantial advantage was gained through substituting the pigment-type colorant for the dye-type colorant in ordinary ball pen inks insofar as erasability was concerned.

As stated above, if a writing medium is to be erasable, the colorant content therein, after being dispensed onto the paper substratum, must remain in such a location that it can be readily removed therefrom with a substantially non-abrasive eraser. Further, the colorant must not be allowed to affix itself either through chemical reaction or through ordinary physical atraction with any substantial degree of permanence to the written-upon surface. If these objectives are to be accomplished, the colorant content of the writing medium must be prevented from penetrating the pores of the substratum and must be shielded from intimate contact with the solid members of the writing surface. Further, if such a medium is to be dispensable from a ball point pen, it follows that the medium must possess physical characteristics which do not differ widely from those of ordinary ball pen inks.

Some success has been achieved in producing erasable ball point pen inks that are transitorily erasable, for example, my prior U.S. Pat. No. 4,097,290, hereinafter referred to as Muller et al., and U.S. Pat. No. 3,875,105 to Daugherty et al. Both of these patents teach the use of an elastomer. The Daugherty et al. patent teaches polyvinyl methyl ether and the parent application thereof, Ser. No. 751,759, teaches Natsyn 2200 which is a synthetic rubber having a chemical structure like natural rubber. My prior Muller et al. patent teaches natural rubber or rubber which essentially duplicates the chemical structure of natural rubber. Both patents disclose the use of a volatile solvent.

Daugherty et al. discloses the volatilizing component as being a solvent for the polyvinyl methyl ether matrix and having an evaporation rate of 3 to 15 on a relative numerical scale on which ethyl ether is assigned an evaporation rate of 1. Daugherty et al. also teaches the possible inclusion of non-volatile solvents for use as pigment dispersing agents of viscosity adjustment solvents. My prior Muller et al. patent discloses a volatile low boiling organic solvent for the elastomer having a boiling point less than 180° C. and exhibiting 100% evaporation within 60 minutes in combination with a non-volatile organic liquid solvent having a high boiling point in excess of 300° C. In summary my prior Muller et al. patent and the Daugherty et al. patent teach an erasable ink that includes the following: (1) the use of a pigment as a colorant; (2) an elastomer; and (3) the use of mixturess of volatile and non-volatile solvents.

My above-referenced copending application Ser. No. 136,786 relates to ink compositions of similar characteristics to the present invention. However, the compositions disclosed are directed to the use of a solvent system which contains a low viscosity solvent for the elastomer component with optional inclusion of minor amounts of volatile solvent for polymer and/or fatty acid lubricant, in addition to pigment.

My above-referenced copending application Ser. No. 247,363 relates to ink compositions of similar characteristics to the present invention. However, the compositions disclosed therein are directed to elastomer component which is natural rubber, synthetic rubber which essentially duplicates the chemical structure of natural rubber and mixtures thereof. The solvent system therein comprises a volatile component in amount of at least 8% by weight of the ink and a low viscosity essentially non-volatile component having a boiling point of less than 300° C. and above 180° C., and an essentially non-volatile component having a boiling point greater than 300° C., in additin to pigment.

My above-referenced copending application Ser. No. 247,982 relates primarily to the method of making ink compositions of similar characteristics to the present invention, and to compositions made by that method. Basically, the method relates to milling pigment into elastomer component, whereafter the pre-pigmented elastomer is dispersed in solvent system.

Japanese patent application 61368/79 filed May 18, 1979 by Pilot Pen Co. Ltd. which was published on Nov. 18, 1980 was cited in my cross referenced related 1981 applications. This Japanese application discloses an elastomer/solvent system/pigment combination which is and will remain truly erasable. To this combination a water soluble dye is added which ultimately is dissolved by the water that is contained in the atmosphere and in the substrate so that the dissolved dye will penetrate into the substrate to produce an indelible trace.

The below-listed prior patents and applications are made of record herein under 37 C.F.R. §1.56:

(1) Daugherty et al., U.S. Pat. No. 3,875,105, issued Apr. 1, 1975 and abandoned application Ser. No. 751,759 filed Oct. 16, 1968, referenced therein;

(2) Muller et al., U.S. Pat. No. 4,097,290, issued June 27, 1978; and (3) Japanese patent application 61368/79, filed May 18, 1979 and laid open and published on Nov. 28, 1980 (Pilot Pen Co. Ltd.)

SUMMARY OF THE INVENTION

An initially erasable ink composition for a ball point writing instrument which ink is characterized by its initial erasability by ordinarily pencil erasers when applied by a ball point writing instrument to an absorbent paper-like writing surface and which thereafter develops permanence. The ink composition comprises a polar elastomer, such as butadiene/acrylonitrile copolymer rubber and vinyl acetate/ethylene copolymer rubber, and mixtures thereof, pigment, and a solvent system from which the final ink composition may be made by simple mixing. The solvent system includes a volatile component and an essentially non-volatile component, said volatile component having a boiling point less than about 180° C. Said essentially non-volatile component includes a pigment vehicle which has a boiling point greater than about 300° C. and a low viscosity plasticizer having a boiling point greater than 180° C. but less than 300° C. The pigment vehicle is present in about the same weight percentage of the ink composition as the pigment component and these are used to provide a pigment paste which contains about 50/50 pigment and pigment vehicle. The elastomer component dissolved in the volatile component is simply admixed with the pigment paste and plasticizer to yield the final ink composition. The total amount of solvent system is adjusted to yield a final ink viscosity in the order of 1.5 million cps for use in a pressurized ball point pen which may be of conventional construction.

Therefore, it is the object of the present invention to produce an erasable ball point ink composition that possesses very smooth writing characteristics and that becomes permanent quicker, i.e., within hours, without compromising its short term erasability by ordinary pencil erasers and which does not require special formulation procedures.

DESCRIPTION OF THE PREFERRED EMBODIMENT

The acceptable range of components for the present invention has been found to be as follows:

TABLE 1

ACCEPTABLE RANGE OF COMPONENTS

| Components | Selected Type | % Amount by Weight |
|---|---|---|
| Polar elastomer | butadiene/acrylonitrile copolymer rubber and vinyl acetate/ethylene copolymer rubber and mixtures thereof | 14-25 |
| Non-polar elastomer | cis-1,4-polyisoprene | 0-10 |
| Colorant | pigment | 18 |
| Volatile solvent | A solvent for the elastomer component and having a boiling point less than | 12-35 |

TABLE 1-continued

ACCEPTABLE RANGE OF COMPONENTS

| Components | Selected Type | % Amount by Weight |
|---|---|---|
| Non-volatile solvent | 180° C. pigment vehicle low viscosity plasticizer | 18 9–27 |

The preferred range of components, percent by weight of the ink, has been found to be as follows: overall elastomer component, 20–25%; colorant, 18%; volatile solvent, 12–35%; and non-volatile component, 27–45%.

Examples of suitable pigments include Victoria Blue, Alkali Blue, Red 2B, Watchung Red and carbon black. The suppliers of such pigments are as follows:

TABLE 2

SUITABLE PIGMENTS AND THEIR SUPPLIERS

| Pigment | Supplier and Location |
|---|---|
| Victoria Blue | E. I. DuPont Wilmington, Delaware |
| Alkali Blue | Sherwin-Williams Co. Cleveland, Ohio |
| Carbon Black | Cities Co. Akron, Ohio |
| Red 2B | BASF Corp. Holland, Michigan |
| Watchung Red | E. I. DuPont Wilmington, Delaware |

Other colors will, of course, require the use of other pigments and there is no intent to limit the pigments to those listed. The only requirements of the pigments are that they impart the desired color to the ink and that they are sufficiently fine to readily pass through the clearance between the ball and retaining lip of the ball point; i.e., approximately 5 microns or less.

The preferred low boiling point or volatile solvent components are non-toxic volatile solvents such as acetone, methyl ethyl ketone (MEK), tetrahydrofuran, cyclohexane, etc.

TABLE 3

SUITABLE VOLATILE SOLVENTS AND THEIR SUPPLIER

| Volatile Solvent | Supplier and Location |
|---|---|
| acetone | Van Waters & Rogers Los Angeles, California |
| methyl ethyl ketone (MEK) | Van Waters & Rogers Los Angeles, California |
| tetrahydrofuran | McKesson Chemical Co. San Francisco, California |
| cyclohexane | Exxon Chemical Co. USA |

Suitable pigment vehicles of the non-volatile component are those which have a boiling point greater than 300° C., such as di(2-ethylhexyl) phthalate, dioctyl phthalate (DOP) and diisodecyl phthalate (DIDP), whereas the preferred low viscosity plasticizer has a boiling point in the range of 180°–300° C. and a viscosity of approximately 2 cps at 25° C., such as 2,2,4-trimethyl-1,3-pentanediol-diisobutyrate (KODAFLEX,TXIB).

TABLE 4

SUITABLE NON-VOLATILE SOLVENTS AND THEIR SUPPLIERS

| Non-Volatile Solvent | Supplier and Location |
|---|---|
| di(2-ethylhexyl) phthalate | Central Solvents Los Angeles, California |
| dioctyl phthalate (DOP) | The Solvent and Chemical Companies Los Angeles, California |
| diisodecyl phthalate (DIDP) | Central Solvents Los Angeles, California |
| KODAFLEX (TXIB) | Eastman Kodak Kingsport, Tennessee |

Suitable polar elastomers are butadiene/acrylonitrile copolymer rubber and mixtures thereof.

TABLE 5

SUITABLE POLAR ELASTOMERS AND THEIR SUPPLIERS

| Polar Elastomers | Supplier and Location |
|---|---|
| butadiene/acrylonitrile copolymer rubber (Hycar 1052) | B. F. Goodrich Cleveland, Ohio |
| vinyl acetate/ethylene copolymer rubber Vynathene 907 (EY907) | USI Chemicals National Distilling and Chemical Corp. New York, N.Y. |

The following examples are illustrative of my present invention.

EXAMPLE I-Color Red

| Components | Selected Type | % Amount by Weight |
|---|---|---|
| Polar elastomer | Hycar 1052 | 25 |
| Colorant | Red 2B | 18 |
| Non-volatile solvent | DOP | 18 |
| Volatile solvent(s) | MEK | 27 |
| Plasticizer | TXIB | 12 |
| | | 100 |

EXAMPLE II-Color Blue

| Components | Selected Type | % Amount by Weight |
|---|---|---|
| Polar elastomer | Hycar 1052 | 23 |
| Colorant | Victoria Blue | 18 |
| Non-volatile solvent | DOP | 18 |
| Volatile solvent(s) | MEK | 23 |
| Plasticizer | TXIB | 18 |
| | | 100 |

EXAMPLE III-Color Blue

| Components | Selected Type | % Amount by Weight |
|---|---|---|
| Polar elastomer | Hycar 1052 | 25 |
| Colorant | Victoria Blue | 18 |
| Non-volatile solvent | DOP | 18 |
| Volatile solvent(2) | tetrahydrofuran | 12 |
| Plasticizer | TXIB | 27 |
| | | 100 |

EXAMPLE IV-Color Black

| Components | Selected Type | % Amount by Weight |
| --- | --- | --- |
| Polar elastomer | Hycar 1052 | 14 |
| Non-polar elastomer | Natsyn 2200 | 10 |
| Colorant | Carbon Black | 13 |
| | Alkali Blue | 5 |
| Non-volatile solvent | DIDP | 18 |
| Volatile solvent(s) | cyclohexane | 12 |
| | MEK | 12 |
| Plasticizer | TXIB | 16 |
| | | 100 |

EXAMPLE V-Color Red

| Components | Selected Type | % Amount by Weight |
| --- | --- | --- |
| Polar elastomer | EY 907 | 20 |
| Colorant | Watchung Red | 18 |
| Non-volatile solvent | DOP | 18 |
| Volatile solvent(s) | MEK | 35 |
| Plasticizer | TXIB | 9 |
| | | 100 |

EXAMPLE VI-Color Blue

| Components | Selected Type | % Amount by Weight |
| --- | --- | --- |
| Polar elastomer | EY 907 | 22.5 |
| Colorant | Victoria Blue | 18 |
| Non-volatile solvent | DOP | 18 |
| Volatile solvent(s) | MEK | 32.5 |
| Plasticizer | TXIB | 9 |
| | | 100 |

In the above examples, the specified non-volatile pigment vehicles were incorporated as the vehicle in a pigment paste consisting of 50% by weight non-volatile solvent and 50% pigment. An elastomer solution was formed without pre-mastication of the elastomer and in the absence of milling by contacting a selected polar elastomer, with stirring, with a volatile solvent for the polar elastomer until the elastomer swelled in the volatile solvent and formed a smooth homogeneous single phase. In each case, the 50/50 weight ratio of vehicle and pigment of the pigment paste was added to the solution of the elastomer component in the volatile solvent and the plasticizer, with mixing. The mixing was continued until a homogeneous ink was obtained. This simple mixing procedure represents a marked advantage over my previous inks, as specified above, in that mastication and milling pigment into the ink composition is not required for the polar elastomers specified. Polar elastomers, such as butadiene/acrylonitrile and vinyl acetate/ethylene rubbers exhibit a further advantage in that they may be selected from a wider Mooney viscosity range, of from about 15 to 60, than non-polar elastomers, such as cis-1,4-polyisoprene. Butadiene/acrylonitrile and vinyl acetate/ethylene rubbers are available in a wide range of molecular weights and with varying degrees of substitution or compatibility with non-polar elastomers, providing a wide range of selection to tailor the ink to a particular specification. Preferably, the polar elastomer is selected from within a molecular weight range of about 90,000 to 1,000,000. Of paramount importance here is the final ink viscosity, erasability with subsequent permanence, writing smoothness and ease of "starting." In general, all of these characteristics have been difficult to obtain principally because the requirement for erasability and subsequent attainment of indelibility or permanence are mutually contradictory requirements and also operate detrimentally with respect to writing performance, e.g., smoothness and ease of "starting." Polar elastomers, such as the polar rubbers described, allow the final ink to approach the consistency of a relatively loose-structure gel, rather than the more rigid non-Newtonian rheology of previously proposed erasable inks. Cis-1,4-polyisoprene rubbers (i.e., natural rubbers or synthetic rubbers which are chemically structured similarly to natural rubber) are elastomers which swell rather than truly dissolve in solvents. Because secondary molecular forces such as chain entanglement prevail in most cis-1,4-polyisoprene rubbers, they are ideally suited for erasable ink compositions. Indeed, they may be used in addition to the polar elastomers of this invention as is evidenced by Example IV above. As noted, however, the use of cis-1,4-polyisoprene rubbers alone normally requires mastication to bring the rubber or rubbers to a Mooney viscosity in the range 17 to 27, whereafter pigment paste is milled into and uniformly dispersed throughout the rubber component to provide pre-pigmented rubber component. The pre-pigmented rubber component is added to the solvent component, with mixing, to yield the final ink composition. With the invention here, as explained above, the mastication of the elastomer and milling of the pigment into the ink composition is eliminated, thus greatly simplifying the process.

The use of polar elastomers as disclosed herein results in improved erasability, writing smoothness and color intensity performance. In addition, relatively non-toxic volatile solvents such as acetone or MEK in place of toluene are usable in the formulations of this invention. Basically, however, the inks of this invention are the homogeneous combination of polar elastomer, pigment, volatile component, medium boiling component (plasticizer) and high boiling component (pigment vehicle).

I claim:

1. In a ball point writing instrument containing an ink capable of depositing a trace on an absorbent, paper-like writing surface having minute voids therein, said trace being characterized by initial erasability thereof by ordinary pencil erasers and the capability of developing permanence over a period of time, said ink comprising pigment, a polar elastomer, said polar elastomer having a selected molecular weight range of about 90,000 to 1,000,000 and a selected Mooney viscosity range of about 15 to 60 and requiring no mastication for use in said ink, and a solvent system, said solvent system comprising a volatile component having a boiling point less than about 180° C. and an essentially non-volatile component which includes pigment vehicle having a boiling point greater than about 300° C. and low viscosity plasticizer having a boiling point greater than 180° C. but less than 300° C., the solvent system being present in amount sufficient to impart a final ink viscosity in the range of about 1.5 million cps.

2. In a ball point writing instrument as defined in claim 1 wherein said polar elastomer is selected from the group consisting of butadiene/acrylonitrile copolymer rubbers and vinyl acetate/ethylene copolymer rubbers and mixtures thereof.

3. In a ball point writing instrument as defined in claim 1 wherein the pigment vehicle is present in about the same weight percentage of the ink composition as is the pigment component and these are used to provide a pigment paste which contains about 50/50 pigment and pigment vehicle.

4. In a ball point writing instrument as defined in claim 1 wherein said polar elastomer is present in the range of about 14-25% by weight.

5. In a ball point writing instrument as defined in claim 1 wherein said volatile component is present in the range of about 39-44% by weight.

6. In a ball point writing instrument as defined in claim 1 wherein said low viscosity plasticizer is present in the range of about 9-27% by weight.

7. In a ball point writing instrument as defined in claim 1 wherein said low viscosity plasticizer has a viscosity of about 2 cps at 25° C.

8. The method of making an ink composition for ball point pen writing instrument, which composition when applied by the pen as a trace on a porous substrate such as paper will exhibit the characteristic of initial erasability by ordinary pencil eraser but developing indelibility with time, which comprises the steps of:

forming an elastomer solution without pre-mastication of the elastomer and in the absence of milling by selecting a polar elastomer and contacting it, with stirring, with a volatile solvent for the polar elastomer until the polar elastomer swells in the volatile solvent and forms a smooth, homogeneous single phase, the solvent having a boiling point at atmospheric pressure of less than 180° C.; and adding to said single phase, with mixing, a trace intensity colorant amount of pigment having a particle size of less than about 5 microns, a writing smoothness and viscosity adjusting amount of an essentially non-volatile solvent component having a boiling point at atmospheric pressure of greater than 300° C., and a viscosity adjusting and indelibility-with-time controlling amount of a low viscosity, essentially non-volatile solvent component having a boiling point at atmospheric pressure which is within the range of 180°-300° C., and continuing such mixing until a smooth, homogeneous final ink composition having the consistency of a relatively loose-structured gel and a viscosity of about 1.5 million cps is attained.

9. In a pressurized ball point writing instrument containing an ink capable of depositing a trace on an absorbent, paper-like writing surface having minute voids therein, said trace being characterized by initial erasability thereof by ordinary pencil erasers and the capability of developing permanence over a period of time, said ink having the consistency of a relatively loose-structured gel and comprising pigment, a polar elastomer having a Mooney viscosity of about 15-60 and a molecular weight in the range of about 90,000-1,000,000 and a solvent system; said solvent system comprising a volatile component having a boiling point less than about 180° C. in which the volatile component is a solvent for the polar elastomer and is present in an amount sufficient, in the presence of the polar elastomer alone, to cause the polar elastomer to swell therein and form a smooth homogeneous single phase, and an essentially non-volatile component which includes pigment vehicle having a boiling point greater than 300° C. and low viscosity plasticizer having a boiling point greater than 180° C. but less than 300° C.; said pigment, polar elastomer and solvent system cooperating to produce said loose-structured gel consistency and being present in such relative amounts as to impart a viscosity in the order of 1.5 million cps to the ink.

10. In a pressurized ball point pen writing instrument as defined in claim 9 wherein said polar elastomer is selected from the group consisting of butadiene acrylonitrile copolymer rubbers, vinyl acetate/ethylene copolymer rubbers and mixtures thereof.

11. In a pressurized ball point pen writing instrument as defined in claim 10 wherein said polar elastomer is present in amount of about 14-25% by weight of the ink.

12. In a pressurized ball point pen writing instrument as defined in claim 11 wherein said volatile component is present in amount of about 12-35% by weight of the ink.

13. In a pressurized ball point pen writing instrument as defined in claim 12 wherein said low viscosity plasticizer is present in amount of about 9-27% by weight of the ink.

* * * * *